June 26, 1962  J. E. FOOTE  3,040,949
FOOD CONTAINER
Filed Dec. 9, 1959  2 Sheets-Sheet 1
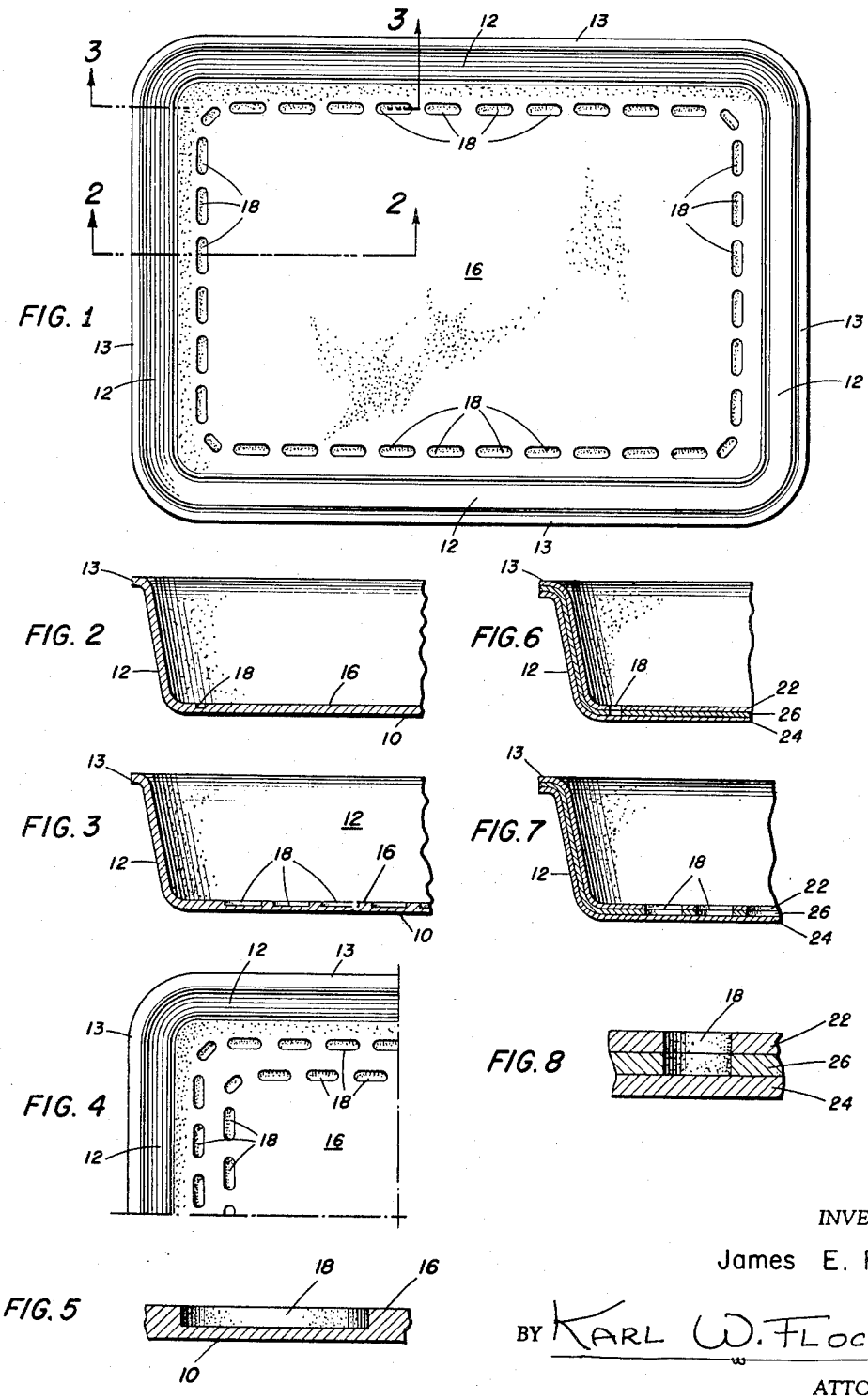
INVENTOR
James E. Foote
BY Karl W. Flocks
ATTORNEY June 26, 1962   J. E. FOOTE   3,040,949
FOOD CONTAINER Filed Dec. 9, 1959   2 Sheets-Sheet 2

INVENTOR
James E. Foote

BY Karl W. Flocks
ATTORNEY

United States Patent Office 3,040,949
Patented June 26, 1962

1

3,040,949
FOOD CONTAINER
James E. Foote, Westport, Conn., assignor to Diamond National Corporation, New York, N.Y., a corporation of Delaware
Filed Dec. 9, 1959, Ser. No. 858,386
1 Claim. (Cl. 229—2.5)

This invention relates to articles molded from fibrous material such as wood pulp, and more particularly to a molded pulp container for packaging and storing meat, poultry and the like.

In most meat markets today, the meat and poultry products are packaged for display and sale in a container made of wood pulp, usually covered by a sheet of cellophane which is attached to the bottom surface of the container. Such containers are generally of a rectangular shape having upstanding side walls and a flat bottom surface adapted to receive the meat.

Such containers have been found to have several deficiencies which, until now, have not been corrected. One difficulty with such containers is that the meat to be packaged may be bloody or wet, and when the customer picks up the package containing the meat or poultry, and subjects it to the normal amount of handling, the juices are free to run around inside the sealed package if there is no means available for trapping these juices.

One of the most difficult problems in packaging meat and poultry effectively is to provide a container that will trap the juice of the meat or poultry without becoming excessively soggy or allowing the juice to leak from the package. These conditions greatly reduce the strength of the product and also reduce the sales appeal.

It has been suggested that the container be made from a highly absorbent pulp by using unsized pulp so that the juices can be rapidly absorbed into the container. Wet strength resins could be added to retain the original strength of the container. The disadvantage of this container is that the highly absorbent pulp not only absorbs the free juices but also acts to dehydrate the meat or poultry contained in the package.

It has also been proposed to provide a plurality of openings or the equivalent covering the bottom surface of the container to trap the free juices. However, it has been found that the meat or poultry packaged in such containers, when removed from the container, will show the pattern of the openings on the surface of the meat or poultry. This is unsightly and causes the products to lose some of their consumer appeal.

It is therefore an object of the present invention to provide a food container particularly adapted for packaging meat and poultry products which will mechanically trap the juices of the product packaged therein without dehydrating these products, or forming markings thereon.

It is a further object of the present invention to provide a molded pulp food container particularly adapted for packaging meat and poultry products that is provided with an improved structure of the bottom surface thereof to effectively trap the juices of the products packaged therein without forming unsightly markings thereon.

It is a still further object of the present invention to provide a meat or poultry container made of molded pulp, having its bottom surface provided with a number of depressions adapted to trap the juices of the products

2 packaged therein without forming a pattern of the depressions on the surface of the meat or poultry.

Another object of the invention is to provide a food container made of molded pulp having a surface in contact with the food product that is relatively non-absorbent and provided with a number of depressions in the bottom surface leading to an intermediate relatively absorbent layer of pulp without forming a pattern of the depressions on the surface of the meat or poultry.

Other objects and the nature and advantages of the instant invention will be apparent from the following descripiton taken in conjunction with the accompanying drawings, wherein:

FIG. 1 is a top plan view of one form of the invention;

FIG. 2 is a cross-sectional view along the line 2—2 of FIG. 1;

FIG. 3 is a cross-sectional view along the line 3—3 of FIG. 1;

FIG. 4 is a fragmentary top plan view showing a modified form of the invention;

FIG. 5 is an enlarged sectional view of a single slot;

FIG. 6 is a fragmentary cross-sectional view taken along the line 2—2 of FIG. 1, showing a modified form of the invention;

FIG. 7 is a fragmentary cross-sectional view taken along the line 3—3 of FIG. 1, showing a modified form of the invention;

FIG. 8 is an enlarged sectional view showing a single slot of a modified form of the invention;

Figure 9:
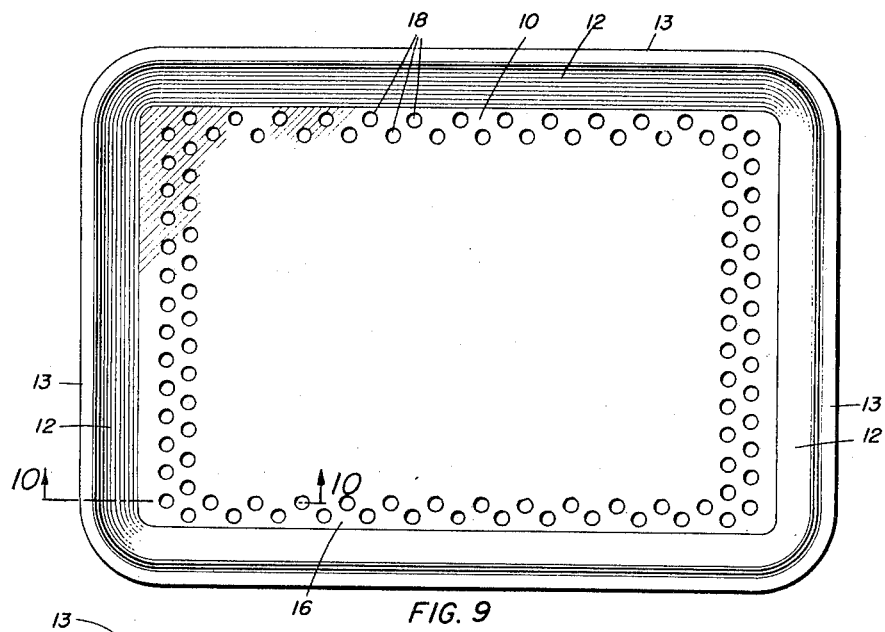
FIG. 9 is a top plan view of another form of the invention.
Figure 10:
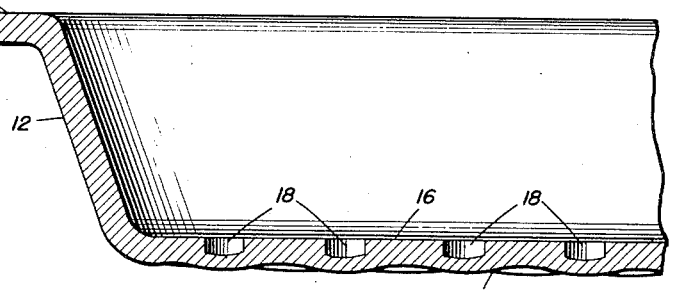
FIG. 10 is a cross-sectional view along the line 10—10 of FIG. 9.
Figure 11:
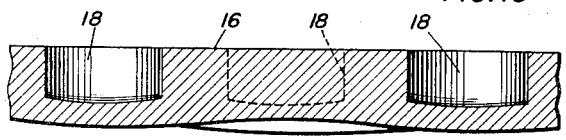
FIG. 11 is a fragmentary cross-sectional view of the depressions shown in FIG. 9.
Figure 13:
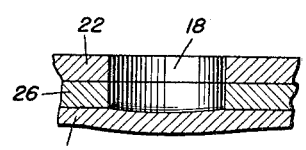
FIG. 13 is a view similar to FIG. 11 showing the form of the invention of FIG. 12.
Figure 12:
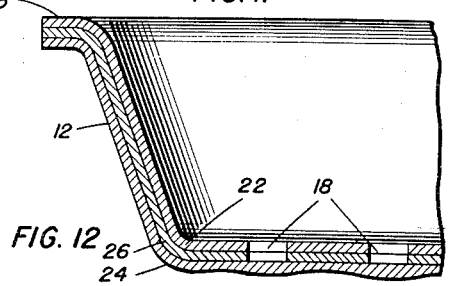
FIG. 12 is a cross-sectional view along the line 10—10 of FIG. 9 showing another form of the invention.

As illustrated in the drawings, the food container in accordance with this invention comprises a bottom wall 10 and four upstanding sloping side walls 12 integral therewith, having a lip 13 extending outwardly around the upper periphery thereof. The upper surface 16 of the bottom wall is provided with a plurality of depressions or openings 18 therein, which are arranged near the outer periphery of the bottom wall leaving the center portion thereof flat and free of depressions.

For maximum effectiveness in trapping liquids, it has been found that the shape and size of the depressions or openings 18 must be closely controlled.

It has now been discovered that the ability of the depressions 18 to mechanically trap the liquids here involved is a function of the shape and size thereof.

In the forms of the invention shown in FIGS. 1 to 8, the depressions or openings 18 are in the form of elongated slots whereas in the form of the invention disclosed in FIGS. 9 to 13 the depressions or openings 18 are in the form of cups of cylindrical shape. When the slots are used it has been discovered that a width of ⅛" and a length of not exceeding ½" of the slots is critical in order to properly mechanically trap these liquids. It has been found that a drop of the liquid will not enter the slots if the width is less than ⅛" and if the width substantially exceeds 1/8", the drop will run out when the container is inverted. Similarly, when the length of the slot exceeds 1/2", it has been found that the drop will not be retained when the container is inverted.

Due to the surface tension of the liquid, the drop will enter the slot and will not run out when the container is inverted when the length and width of the slot are in the critical range of 1/8" wide and 5/32" to 1/2" long.

When the cups or cylindrical shaped openings 18 are used, it has been discovered that a diameter of 5/32" to 7/32" of the cups is critical in order to properly mechanically trap these liquids. A drop of the liquid will not enter the cups if the diameter is less than 5/32", and if the diameter is greater than 7/32" the drop will run out when the container is inverted.

Further, it has been found that the efficiency of the depressions or openings 18 in trapping liquids requires that they have a sharply defined side and upper lip, as illustrated in the figures.

For maximum effectiveness, the depressions or openings should have smooth side walls, as well as a sharply defined upper lip. These features can be obtained by molding the pulp over a forming wire containing solid nubbins of rubber, bronze or plastic arranged thereon at the desired locations of the openings. In molding the pulp fibers in this manner, the resulting container is found to have a rather regular pattern of fibers along the upper surface of the bottom wall of the container which is formed against the perforate forming wire and has the characteristic woven felted pattern to the fibers. On the contrary, the fibers formed against the solid nubbins are at random and form a rather irregular pattern of fibers formed around the nubbins. The irregular pattern along the side walls of the openings 18 results in increased absorption along these areas. Therefore, the absorption from the side walls of the cups is more rapid than the absorption from the top surface of the container.

The depth of the depressions or openings in the bottom of the food containers has been found to be important also. For maximum effectiveness, the openings should be as deep as possible, consistent with the thickness of the bottom wall. Openings having a depth of .040" or greater have been found satisfactory.

The number of the openings is not critical. However, it has been found that a number of advantages results from arranging the openings in one or more rows near the outer periphery of the flat bottom wall 16, as shown in the figures. When the product being packaged is removed from the container, the pattern of the depressions may be seen on the surface of the meat, particularly where the pattern of the depressions covers substantially the entire bottom surface of the container. By arranging the depressions adjacent the outer periphery of the bottom wall of the container, the markings on the meat product are eliminated and the dehydration of the meat product is reduced.

A specific example of such a container is shown in FIG. 1, wherein adjacent the entire outer periphery of the upper surface of the bottom wall are distributed a line of slots of approximately 1/8" width and 3/8" length separated one from another by a distance of approximately 3/16". The slots have sharply defined side walls and upper lips.

The specific example of FIG. 4 shows a pair of rows of slots in staggered arrangement adjacent the outer periphery of the upper surface of the bottom wall. The size of the slots is similar to those described in conjunction with FIG. 1.

The specific example shown in FIG. 9 illustrates a plurality of openings in the form of cups or cylindrical shapes arranged about the outer periphery of the bottom wall of the container.

As described heretofore, the inner walls of the depressions or slots are more absorbent than the top of the bottom wall of the container so that any juices will pass through the openings and will become mechanically trapped therein. These trapped juices will then be absorbed by the more absorptive inner walls of the openings.

In the modified form of the invention shown in FIGS. 6, 7, 12 and 13, the absorptiveness of the inner walls of the openings can be increased in the manner shown. This is accomplished by molding the container in a plurality of layers or plies. The upper ply 22 and the lower ply 24 are molded from pulp which is relatively non-absorbent material containing sizing therein. The inner ply 26, on the other hand, is molded from a very absorbent material. The ability to absorb and distribute the liquid throughout the inner ply is enhanced by adding wetting agents and wet strength resins thereto. The wet strength resins act to increase the strength of the middle ply when it is wet.

The liquids trapped in the openings 18 will thus be absorbed by the inner absorbent ply 26 which will act as a blotter for such liquids. In this manner, the juices will be absorbed inside of the container so that the upper and lower surfaces will remain relatively unaffected by such juices.

The openings or depressions 18 extend downwardly through the upper ply 22 and through at least a portion of the inner ply 26; preferably the openings extend through both the upper and inner ply down to the top surface of the lower ply 24.

It has been found that a 3-ply container of this type will absorb large amounts of liquid. In fact, such a container was found to absorb a weight of liquid more than twice the weight of the dry container. In one test the container absorbed 50 grams of liquid and yet the upper and lower surfaces of the container were relatively dry.

If desired, the middle ply may be made of a different color from the upper and lower ply. The method of manufacturing such a 3-ply container will next be described.

A wire screen mold having the shape of the desired container and provided with a plurality of solid nubbins attached thereto is first prepared. The nubbins are of such a shape and distribution as to produce openings in the bottom wall of the container of the shape and distribution desired. A first layer of a relatively non-absorbent pulp material is first applied to the wire screen mold followed by suction to remove the water from the pulp through the wire screen. A second layer of a relatively absorbent pulp material is next applied to the wire screen containing the first layer thereon and suction is again applied to remove the water from the second layer of pulp. A third layer of a relatively non-absorbent pulp material is then applied to the wire screen containing the first and second layers thereon and suction is again applied to remove the water from the third layer of pulp. The three layers of pulp thus form the container of the desired thickness having the plurality of openings in its bottom wall corresponding to the shape and distribution of the nubbins on the wire screen. The container is then removed from the mold and dried in the usual manner. The thicknesses of the three or more layers of pulp can be so controlled so that the openings will extend through the upper layer and at least partially through the second layer of pulp. It should be understood that any number of layers of pulp can be applied and that the characteristic of each layer can be varied as desired to control the color and absorptive characteristics of each layer.

It will be obvious to those skilled in the art that various changes may be made without departing from the spirit of the invention and therefore the invention is not limited to what is shown in the drawings and described in the specification, but only as indicated in the appended claim.

What is claimed is:

A food container of pulp material adapted for the packaging of meat and poultry comprising a bottom wall joined integrally around its periphery to a continuous upstanding side wall, said container having three plies of pulp material extending therethrough, the upper and lower ply being relatively non-absorbent, and the intermediate ply being relatively absorbent, a plurality of openings extending downwardly from the upper surface of said bottom wall through the upper ply and at least partially through the intermediate ply, all of said openings being arranged adjacent the outer periphery of said bottom wall near the juncture of the bottom wall and the side wall, said openings each having a sharply defined vertical side wall and upper lip, said depressions being of such shape and size as to be capable of mechanically trapping any juices resulting from the food product stored therein due to the surface tension of said juices, whereby any juices resulting from the food products stored therein will pass into said openings from whence they will be absorbed by said intermediate ply.

References Cited in the file of this patent

UNITED STATES PATENTS

| | | |
|---|---|---|
| 1,701,238 | Kennedy | Feb. 5, 1929 |
| 2,814,427 | Emery | Nov. 26, 1957 |
| 2,974,843 | Reifers et al. | Mar. 14, 1961 |

FOREIGN PATENTS

| | | |
|---|---|---|
| 1,086,193 | France | Aug. 4, 1954 |